United States Patent
Matsuda et al.

(10) Patent No.: US 6,623,873 B1
(45) Date of Patent: Sep. 23, 2003

(54) MAGNETIC RECORDING MEDIUM AND MAGNETIC DISK APPARATUS USING THE SAME

(75) Inventors: Yoshibumi Matsuda, Hiratsuka (JP); Yotsuo Yahisa, Odawara (JP); Koji Sakamoto, Odawara (JP); Yuzuru Hosoe, Hino (JP); Akira Kato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/444,560

(22) Filed: Nov. 19, 1999

(30) Foreign Application Priority Data

Nov. 20, 1998 (JP) .............................. 10-330544

(51) Int. Cl.[7] .............................. G11B 5/66; G11B 5/70
(52) U.S. Cl. .......................... 428/694 TS; 428/694 TM; 428/900
(58) Field of Search .................... 428/694 TS, 694 TM, 428/900; 360/135

(56) References Cited

U.S. PATENT DOCUMENTS

| | | | | |
|---|---|---|---|---|
| 5,763,071 A | * | 6/1998 | Chen et al. ................. | 428/332 |
| 5,900,324 A | * | 5/1999 | Moroishi et al. ........... | 428/611 |
| 6,071,607 A | * | 6/2000 | Okuyama et al. .......... | 428/332 |
| 6,077,586 A | * | 6/2000 | Bian et al. ................. | 428/65.3 |
| 6,143,388 A | * | 11/2000 | Bian et al. ................. | 428/65.3 |
| 6,174,597 B1 | * | 1/2001 | Yusu et al. ................. | 428/332 |

FOREIGN PATENT DOCUMENTS

| | | | |
|---|---|---|---|
| EP | 0840293 | * | 5/1998 |
| JP | 62-257618 | | 11/1987 |
| JP | 5-114128 | | 5/1993 |
| JP | 9-265619 | | 10/1997 |
| JP | 10-143865 | | 5/1998 |
| JP | 10-214412 | | 8/1998 |
| JP | 10-228621 | | 8/1998 |

OTHER PUBLICATIONS

Journal of Applied Physics, vol. 79, No. 8, Apr. 15, 1996, "Reduction of Co–Cr–Pt media nosie by addition of Ti to Cr underlayer", Y. Matsuda et al, pp. 5351–5353.

IEEE Transactions on Magnetics, vol. 34, No. 4, Jul. 1998, "Thermal Aftereffects in Thin Film Magnetic Recording Media", Y. Hosoe et al, pp. 1528–1532.

* cited by examiner

Primary Examiner—Holly C. Rickman
(74) Attorney, Agent, or Firm—Mattingly, Stanger & Malur, P.C.

(57) ABSTRACT

A magnetic recording medium includes an underlayer of a nonmagnetic alloy containing chromium and titanium, a magnetic layer of a Co—Cr—Pt—Ta or Co—Cr—Pt—B alloy, and an intermediate layer of a Co—Cr—Pt alloy and being disposed between the underlayer and the magnetic layer, thereby carrying out high-density information recording and reproducing operation.

5 Claims, 5 Drawing Sheets

MAGNETIC RECORDING MEDIUM AND MAGNETIC DISK APPARATUS USING THE SAME

BACKGROUND OF THE INVENTION

The present invention relates to a magnetic recording apparatus used, for example, as an auxiliary storage of a computer and a magnetic recording medium for use with the apparatus, and in particular, to a thin-film magnetic recording medium suitable for a magnetic recording apparatus having a high surface recording density of at least five gigabits per square inch.

Due to development of the information-oriented society, the quantity of information daily used is rapidly increasing. Consequently, it is highly required to increase the recording density and capacity of magnetic recording apparatus. The magnetic heads employ an inductive head using a voltage change which appears in response to a change of a magnetic flux with respect to time. These heads are used for the data recording and reading operations. In contrast the heads of this type, there has been increasingly used at a higher speed a composite head including a recording head and a read-back or reproducing head in which the read-back head is a magnetoresistive read-back head having higher efficiency or sensitivity. The magnetoresistive head uses a change in its electric resistance in response to a change in leakage flux from a medium on which data to be read is recorded. Moreover, a giant magnetoresistive (GMR) head having still higher efficiency or sensitivity has been developed to be put to practice, the GMR head using a considerably great change in magnetic resistance (giant magnetoresistive effect or spin valve effect) due to a multilayered structure including a plurality of magnetic layers accumulated with a nonmagnetic layer therebetween. The giant magnetoresistive effect or spin valve effect is an effect in which relative directions of magnetization of the plural magnetic layers arranged with a nonmagnetic layer therebetween are changed by a leakage magnetic field from the medium, which resultantly varies the electric resistance.

The magnetic recording medium practically employed at present includes magnetic layers made of alloys primarily based on cobalt such as Co—Cr—Pt, Co—Cr—Ta and Co—Cr—Pt—Ta. These cobalt alloys have a hexagonal structure (hcp structure) in which a c axis is an axis for easy magnetization. Therefore, for an in-plane magnetic recording medium in which its magnetization is reversed in a magnetic film plane for the recording of information, the c axis of the cobalt alloys is set to (11.0) orientation for crystallization in which the c axis takes an in-plane direction. However, the (11.0) orientation is unstable and hence it is generally impossible to produce such a cobalt alloy directly on a substrate. To overcome this difficulty, there has been employed a method advantageously using a good matching property of a Cr(100) plane having a body-centered cubic (bcc) structure with the Co(11.0) plane. Namely, an underlayer film of chromium is first formed with (100) orientation on a substrate and then a magnetic layer of a cobalt alloy is epitaxially grown on the underlayer such that the c axis of the magnetic layer of cobalt alloy is oriented (11.0), namely, has an in-plane direction. To further increase the crystal lattice matching property in a boundary between the cobalt alloy magnetic film and the chromium underlayer, there has been adopted a method to add a second element to chromium to increase lattice spacing of the chromium underlayer. This enhances the (11.0) orientation in the cobalt alloy to resultantly increase coercivity thereof. JP-A-62-257618 and JP-A-63-197018 describe examples of the technology above in which elements such as vanadium and titanium are added to the chromium underlayer. In addition to the increase in coercivity of the recording medium, the decrease in noise is an essential factor for a higher recording density. The magnetoresistive head has quite a high reproducing efficiency and hence is suitable for high-density recording. However, the head is highly efficient not only to reproduced signals from a magnetic recording medium but also highly sensitive to the noise. Therefore, it is required to much more reduce the noise as compared with the recording medium. Japanese Patent No. 2650282 proposes alloy films, for example, a Cr—Mo film as an underlayer which increases coercivity and coercivity squareness and which decreases the medium noise. JP-A-10-228621 describes a combination of a Cr—Mo underlayer with a Co—Cr—Pt—Ta magnetic film. JP-A-4-221418 describes a magnetic recording medium in which a cobalt alloy magnetic layer includes at least platinum and boron to increase coercivity for the increase in the recording density. JP-A-9-293227 describes a combination of a Cr—Mo underlayer with a Co—Cr—Pt—B magnetic layer.

According to JP-A-10-74314, a Co-based nonmagnetic alloy layer is fabricated below the underlayer to decrease the medium noise. In accordance with JP-A-10-143865, chromium and zirconium which are relatively easily oxidized are added to the Co-based nonmagnetic alloy layer such that a surface of the layer is disposed to atmosphere of oxygen to be slightly oxidized so as to further decrease the medium noise in a stable state. JP-A-9-265619 and JP-A-10-214412 describe magnetic recording medium including a Cr-based underlayer in a b.c.c. structure on an alloy film (seed layer) including zirconium and titanium.

On the other hand, JP-A-1-303624 describes a magnetic recording medium having a high recording density. The medium includes two magnetic layers, i.e., a first magnetic layer is a Co-based recording film and a second magnetic layer is a layer which includes cobalt and chromium as primary elements and to which carbon, titanium, zirconium, niobium, and tungsten are added. However, this medium has a coercivity of 64 kA/m (800 oersted). This is less than the value, 160 kA/m (2000 oersted), required for the present invention. JP-A-5-114128 describes a method to lower the medium noise and to increase the recording density in which the medium includes two magnetic films, i.e., a lower layer is a Co—Cr—Ta alloy with a lower medium noise and a higher layer is a Co—Cr—Pt alloy with high coercivity.

It has been commonly known that the medium noise can be effectively lowered by reducing sizes of crystal grains of the magnetic film and possibly equalizing grain sizes to each other. The technologies above also use this advantageous effect. Such an example is written in pages 5351 to 5353 of J. Appl. Phys., vol. 79 (1996). Namely, the crystal grains become finer by using a Cr—Ti alloy underlayer when compared with the prior art employing a Cr underlayer, and the matching of the lattice constant with respect to the Co—Cr—Pt alloy is improved to resultantly increase coercivity. It is also known as described in this article that the medium noise is efficiently lowered by increasing the Cr concentration of the Co—Cr—Pt magnetic layer. On the other hand, JP-10-143865 describes a medium including a glass substrate. Namely, for example, when the Cr—Ti alloy underlayer and the Co—Cr—Pt magnetic film are fabricated after slightly oxidizing a surface of the Co—Cr—Zr seed layer, the c axis which is an axis for easy magnetization in the h.c.p. structure of the Co—Cr—Pt magnetic layer is oriented to be parallel to the film surface plane, i.e., in (11.0) orientation, and the crystal grains becomes finer, leading to a higher signal-to-noise (S/N) ratio. After fabricating a Co—Cr—Zr seed layer with composition of 60 at. % Co-30 at. % Cr-10 at. % Zr, a surface of the seed layer is slightly oxidized and an 80 at. % Cr-20 at. % Ti underlayer and a Co—Cr—Pt magnetic film are manufactured thereon to obtain a medium. Having producing samples of medium with different values of chromium concentration as 73 at. % Co-19 at. % Cr-8 at. % Pt, 71 at. % Co-21 at. % Cr-8 at. % Pt, and 69 at. % Co-23 at. % Cr-8 at. % Pt, read/write characteristics are evaluated using a magnetic recording disk having a surface recording density of five gigabits per square inch. As a result, the read/write characteristics are improved as the chromium concentration is increased in the Co—Cr—Pt magnetic film. For 69 at. % Co-23 at. % Cr-8 at. % Pt, the medium noise takes a minimum value and satisfies the requirement specified. Reduction in read outputs from these medium containing data written in 7090 fr/mm (180 FCI) was examined at about 1000 hours after the data write operation. Results show that the read outputs are kept unchanged for the medium of 73 at. % Co-19 at. % Cr-8 at. % Pt and 71 at. % Co-21 at. % Cr-8 at. % Pt. However, the read outputs are reduced about 5% for the medium of 69 at. % Co-23 at. % Cr-8 at. % Pt. If the rate of reduction in the read outputs is assumed to be fixed with respect to lapse of time, it is expected that the read outputs are lowered about 10% in ten years. This is practically a considerable problem for the magnetic recording apparatus. In pages 1528 to 1533 of IEEE Trans. on Magn., vol. 34 (1998), this problem is discussed as a problem of thermal fluctuation in which the intensity of magnetization recorded on a medium decreases with a lapse of time. The medium including the 69 at. % Co-23 at. % Cr-8 at. % Pt magnetic film has a low S* value of 0.65 and hence a lower recording resolution, which does not satisfy the requirement specified. To examine the problem of thermal fluctuation, the Co—Cr—Pt—Ta magnetic film and the Cr—Mo underlayer described in JP-A-10-228621 are combined with each other to fabricate a sample. This sample shows a low reduction in the read outputs and a favorable characteristic against thermal fluctuation. However, it has been found that since the crystal grains become greater for the Cr—Mo underlayer, the medium noise is increased. On a Cr—Ti underlayer which is oriented with (200) and which has finer crystal grain sizes, a Co—Cr—Pt—Ta magnetic film was fabricated. With a Ta concentration equal to or more than about 2 at. %, which is effective to withstand thermal fluctuation, the c axis of the magnetic film disperses in a three-dimensional manner with respect to the film plane and hence the (11.0) plane cannot be epitaxially grown. Consequently, the magnetic recording medium in which a Cr—Ti underlayer and a Co—Cr—Pt—Ta magnetic film are accumulated shows low coercivity and low coercivity squareness, and hence there are obtained only insufficient read/write characteristics.

As an example of the medium structure described in JP-A-9-293227, samples of medium including a combination of a Co—Cr—Pt—B magnetic film and a Cr—Mo underlayer are fabricated. It has been found that the medium has a low reduction in the read outputs and a favorable characteristic against thermal fluctuation. However, it has been recognized that the medium noise is increased since crystal grains become greater for the Cr—Mo underlayer. On a Cr—Ti underlayer which is oriented (200) and which has finer crystal grain sizes, a Co—Cr—Pt—B magnetic film was fabricated. With a boron concentration equal to or more than about 2 at. %, effective to withstand thermal fluctuation, the c axis of the magnetic film in the h.c.p. structure disperses in a three-dimensional manner with respect to the substrate plane. namely, the (11.0) plane cannot be epitaxially grown. Therefore, the magnetic recording medium in which a Cr—Ti underlayer and a Co—Cr—Pt—B magnetic film are accumulated shows low coercivity and low coercivity squareness, leading only to insufficient read/write characteristics.

SUMMARY OF THE INVENTION

It is therefore an object of the present invention to provide a magnetic recording medium suitable for implementing a magnetic recording apparatus with a surface recording density of at least five gigabits per square inch in which read outputs are only slightly reduced with respect to time even when the medium noise is low, namely, the medium is resistive against thermal fluctuation and has a high recording resolution, thereby removing the problems above.

The object above can be achieved in accordance with the present invention by quasi-epitaxially growing a magnetic layer including a Co—Cr—Pt—Ta or Co—Cr—Pt—B alloy having lower thermal fluctuation on an underlayer including a Cr—Ti nonmagnetic alloy of which grain sizes can be reduced. The inventors have found that the condition above can be satisfied by disposing an underlayer including a Cr—Ti-based nonmagnetic alloy and an intermediate layer including Co—Cr—Pt. On an underlayer of Cr—Ti alloy in a b.c.c. structure oriented (200) with respect to a substrate plane, an intermediate layer of a Co—Cr—Pt alloy is fabricated to thereby produce a Co—Cr—Pt alloy in an h.c.p. structure oriented (11.0). On the intermediate layer, a magnetic layer including a Co—Cr—Pt—Ta or Co—Cr—Pt—B alloy having an h.c.p. structure like the Co—Cr—Pt alloy is grown. Through an epitaxial growth, the c axis, i.e., an axis for easy magnetization is oriented (11.0) to be parallel to the film surface plane. The c axis of the magnetic film having the h.c.p. structure is parallel to the film plane, which enhances magnetic anisotropy in the plane and hence increases the coercivity and the coercivity squareness. This advantageously increases the signal-to-noise ratio and the recording resolution. As a result, there is obtained an in-plane magnetic recording medium which is effective to minimize the crystal grain size of the Cr—Ti underlayer and which is resistive against thermal fluctuation of the magnetic film including a Co—Cr—Pt—Ta alloy. The Cr—Ti underlayer has a Ti concentration from about 10 at. % to about 26 at. %, favorably, from about 14 at. % to about 24 at. % for the following reason. In this Ti concentration range, the crystal grain size can be easily reduced. In this connection, a Co—Cr—Pt—Ta alloy includes cobalt as its primary constituent element and further includes at least chromium, platinum, and titanium. In addition to a Co—Cr—Pt—Ta alloy, there may be used a Co—Cr—Pt—Ta alloy to which niobium, boron, and titanium are added, the concentration thereof ranging from about one at. % to about three at. %. In this constitution, the crystal grain sizes can be reduced and homogenized, leading to a favorable effect. When boron is added, the grain size can be minimized and the coercivity can be increased, which is quite desirable to increase the recording density. Moreover, a Co—Cr—Pt—B alloy is an alloy including cobalt as its primary element and at least chromium, platinum, and boron.

The intermediate layer including the Co—Cr—Pt alloy is favorably a ferromagnetic material. Namely, it is then possible to control such magnetic properties as coercivity, coercivity squareness, and residual magnetism. However, when the chromium content is insufficient in the intermediate layer of Co—Cr—Pt alloy, the medium noise becomes greater. When the chromium content is excessive in the Co—Cr—Pt alloy layer, the coercivity is lowered. Therefore, the chromium concentration is appropriately set to from about 18 at. % to about 24 at. %. The chromium content is more favorably in a range from about 20 at. % to about 24 at. % because the medium noise is remarkably minimized under this condition. To control the coercivity in a range from about 175 kA/m (2.2 kilooersted) to about 287 kA/m (3.5 kilooersted), the platinum concentration is appropriately ranges from about 8 at. % to about 20 at. %. When the tantalum concentration is about 1.5 at. % or less in the Co—Cr—Pt intermediate layer, the medium noise is advantageously decreased. This is remarkable especially when a Co—Cr—Pt—B alloy is employed as the magnetic film. In this situation, when the tantalum concentration exceeds 1.5 at. %, the (11.0) orientation of the Co—Cr—Pt—Ta intermediate layer is disturbed, which considerably reduces the coercivity and the coercivity squareness. Therefore, the tantalum concentration is favorably equal to or less than 1.5 at. %. For a high surface recording density of at least ten gigabits per square inch, the chromium concentration in the Co—Cr—Pt intermediate layer is favorably set to about 28 at. % or more so that the layer becomes a nonmagnetic film, which is more resistive against thermal demagnetization.

To achieve the object above, it is not necessarily needed to fabricate a two-layer cobalt alloy film in which a Co—Cr—Pt intermediate layer is fabricated below a magnetic layer of a Co—Cr—Pt—Ta or Co—Cr—Pt—B alloy. Namely, the advantage can be similarly obtained by employing a magnetic layer of a Co—Cr—Pt—Ta or Co—Cr—Pt—B alloy having composition of a Co—Cr—Pt as follows in the proximity of a surface thereof which is brought into contact with the Cr—Ti underlayer. The composition includes the tantalum or boron concentration which consecutively increases toward a medium surface along the growing direction thereof. When a magnetic film of which the tantalum or boron concentration has a gradient in a direction of film thickness is used, since the magnetic film includes a reduced number of lattice defects, the crystal grain sizes become more homogenous. This also improves magnetic continuity of the magnetic film in the film growing direction and hence the inversion of magnetization becomes abrupt in the recording operation, which favorably reduces the medium noise.

When a second underlayer which includes chromium as its primary element and which includes at least one of molybdenum and tungsten is fabricated between an underlayer of a nonmagnetic alloy containing chromium and titanium and an intermediate layer of a Co—Cr—Pt alloy, there is obtained high coercivity suitable for a higher recording density. This advantage is remarkable when the platinum concentration of the magnetic film of the Co—Cr—Pt—Ta or Co—Cr—Pt—B alloy ranges from about 12 at. % to about 20 at. % and the total concentration of molybdenum and tungsten in the second underlayer ranges from about 16 at. % to 50 at. %. When the Co—Cr—Pt intermediate layer is at least about four nanometer (nm) thick, the platinum concentration in the intermediate layer desirably ranges from about 12 at. % to about 20 at. % to increase epitaxy of the second underlayer and the magnetic layer via the intermediate layer.

The magnetic film favorably has magnetic properties as follows. The coercivity measured with a magnetic field applied in the in-plane region is at least 200 kA/m (2.5 kilooersted), product Br×t between residual magnetic flux density Br and film thickness t measured under the same condition is at least 2.0 T·nm (20 Gauss·micron) and at most 10 T·nm (100 Gauss·micron), there can be obtained favorable read/write characteristics in a recording density equal to or more than five gigabits per square inch. When the coercivity becomes less than 200 kA/m (2.5 kilooersted), the read outputs are lowered in a high recording density exceeding 12000 fr/mm (300 kilo-flux reversals per inch (kFCI)). When product Br×t exceeds 10 T·nm (100 Gauss·micron), the read outputs are lowered in a high recording density exceeding 12000 fr/mm (300 kFCI). When product Br×t is less than 2.0 T·nm (20 Gauss·micron), the read outputs are minimized in a low recording density. When the coercivity measured with a magnetic field applied in the in-plane region is at least 280 kA/m (3.5 kilooersted) and product Br×t measured under the same condition is at least 2.0 T·nm (20 Gauss·micron) and at most 6.5 T·nm (65 Gauss·micron), there are favorably obtained satisfactory read/write characteristics in a recording density equal to or more than 20 gigabits per inch. When the coercivity becomes less than 280 kA/m (3.5 kilooersted), the read outputs are lowered in a high recording density exceeding 16000 fr/mm (400 kFCI). When Br×t exceeds 6.5 T·nm (65 Gauss·micron), the read outputs are decreased in a high recording density exceeding 16000 fr/mm (400 kFCI). When Br×t is less than 2.0 T·nm (20 Gauss·micron), the read outputs are disadvantageously lowered in a low recording density.

When a film of a material including carbon as its primary element is fabricated with a width ranging from about 3 nm to about 12 nm on the magnetic layer and a lubricant layer of an adsorptive material such as perfluoroalkyl-polyether is disposed on the film with a thickness of about 1 nm to about 3 nm, there is obtained a reliable magnetic recording medium applicable to a high density recording operation. By using a substrate of an aluminum alloy plated with Ni—P, there can also be produced a medium having a reduced medium noise and being more resistive against thermal fluctuation.

In a magnetic recording disk apparatus including the magnetic recording medium above, a driving section to drive the medium in a recording direction, a magnetic head including a recording section and a read-back section, means for relatively moving the head relative to the medium, and read/write signal processing means for inputting a signal to the head and for reproducing a signal from the head, when the read-back section of the magnetic head includes a plurality of conductive magnetic layers of which resistance remarkably changes when a direction of magnetization of each conductive magnetic layer is relatively changed due to an external magnetic field and a magnetoresistive sensor disposed between the conductive magnetic layers, the sensor including a conductive nonmagnetic layer, i.e., the head being configured in a so-called giant magnetoresistive (GMR) head, there can be obtained a signal intensity for a high recording density and hence a reliable magnetic recording disk apparatus having a recording density of at least five gigabits per square inch.

When the magnetic recording medium of the present invention is used in a magnetic recording disk apparatus, it is desirable that the magnetoresistive head includes a magnetoresistive sensor section fabricated between two shield layers which are made of a soft magnetic substance and which are apart from each other about 0.12 micrometers to about 0.2 micrometers. When the gap between the shield layers exceeds 0.2 micrometers, the read output becomes insufficient in a maximum linear recording density exceeding 8700 fr/mm (220 kFCI). When the gap is less than 0.12 micrometers, it is difficult to appropriately retain insulation between the magnetoresistive sensor and each of the shield layers.

BRIEF DESCRIPTION OF THE DRAWINGS

The objects and features of the present invention will become more apparent from the consideration of the following detailed description taken in conjunction with the accompanying drawings in which.

DESCRIPTION OF THE EMBODIMENTS

Embodiment 1

Figure 1:
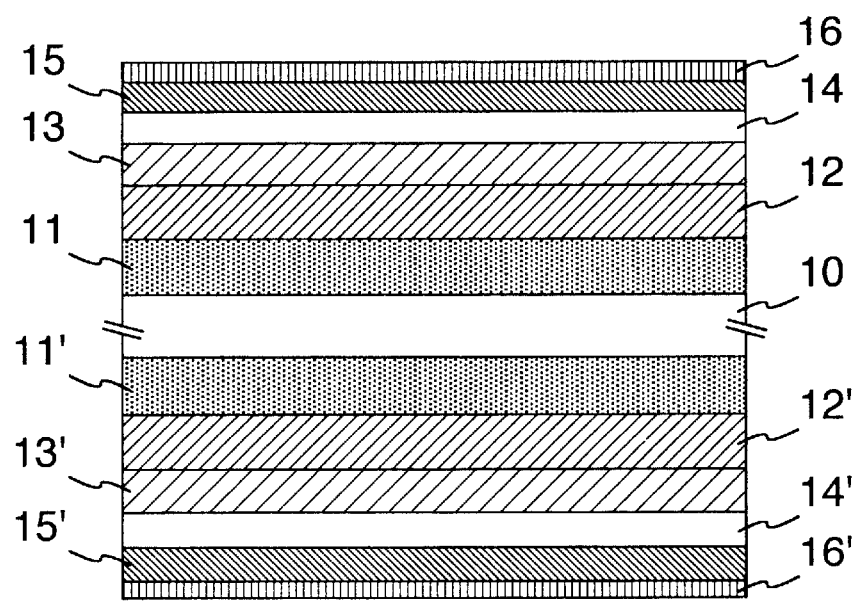
FIG. 1 is a schematic diagram showing an example of a cross-sectional configuration of a magnetic recording medium in accordance with the present invention.
Figure 2:
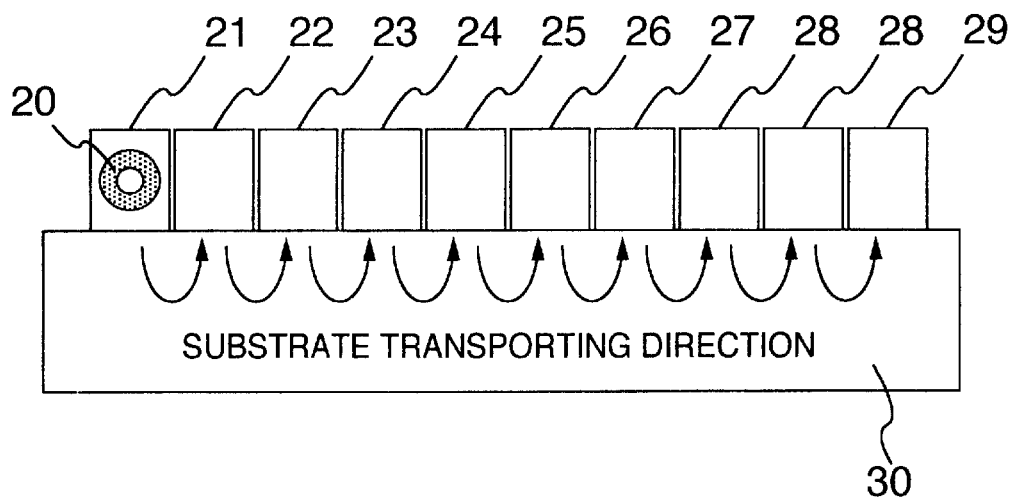
FIG. 2 is a diagram schematically showing a film fabricating apparatus for the magnetic recording medium in accordance with the present invention.

FIG. 1 shows a film configuration of a magnetic recording medium of the first embodiment. This configuration includes a substrate 10 made of is chemically tempered soda-lime glass of 2.5 inch type. On substrate 10 washed, a plurality of layers are fabricated with a tact of nine seconds by a sputtering apparatus (MDP250B) of Intevac. FIG. 2 shows a chamber or station configuration of the sputtering apparatus. On substrate 10, there are fabricated 27 nm thick seed films 11 and 11' with a 70 at. % Ni-20 at. % Cr-10 at. % Zr alloy, 28 nm thick underlayers 12 and 12' with a 80 at. % Cr-20 at. % Ti alloy, magnetic intermediate layers 13 and 13' with a 68 at. % Co-22 at. % Cr-10 at. % Pt alloy, magnetic layers 14 and 14' with a 68 at. % Co-21 at. % Cr-8 at. % Pt-3 at. % Ta alloy, and 10 nm thick protective carbon layers 15 and 15'. In each film fabrication, an argon gas is at a pressure of 0.9 Pa (7 mTorr). An oxygen partial pressure monitored by a main chamber 29 during the film fabrication is from about $1\times10^{-7}$ Pa to about $1\times10^{-6}$ Pa ($1\times10^{-9}$ Torr to about $1\times10^{-8}$ Torr) The seed layers are manufactured in a seed film chamber 22 without heating the substrate and are then heated up to 270° C. by a lamp heater in a heating chamber 23. The sheet layers are thereafter exposed to an atmosphere of a mixed gas of 99 vol % Ar-1 vol % $O_2$ at 0.9 Pa (7 mTorr) at a gas flow rate of 20 standard cubic centimeter per minute (sccm) for 3.5 seconds in an oxidization chamber 24. Thereafter, the respective films are fabricated thereon in an underlayer chamber 25, a magnetic intermediate film chamber 26, a magnetic film chamber 27, and protective film chambers 28 and 28'. After the protective carbon layers are manufactured, a lubricant containing perfluoroalkyl-polyether as its primary element is coated thereon to form 1.7 nm thick lubricant films 16 and 16'.

As can be seen from Table 1, samples a to c are prepared such that the magnetic intermediate layers and the magnetic layers have thicknesses to set product Br×t of residual magnetic flux density Br of the medium and thickness t of the magnetic film to 7.5 T·nm (75 Gauss·micron). Observation of cross sections of these medium by a transmission electron microscope (TEM) shows no clear boundary between the magnetic film and the intermediate magnetic film, namely, these films are manufactured as substantially one layer.

Comparison Example 1

Figure 3:
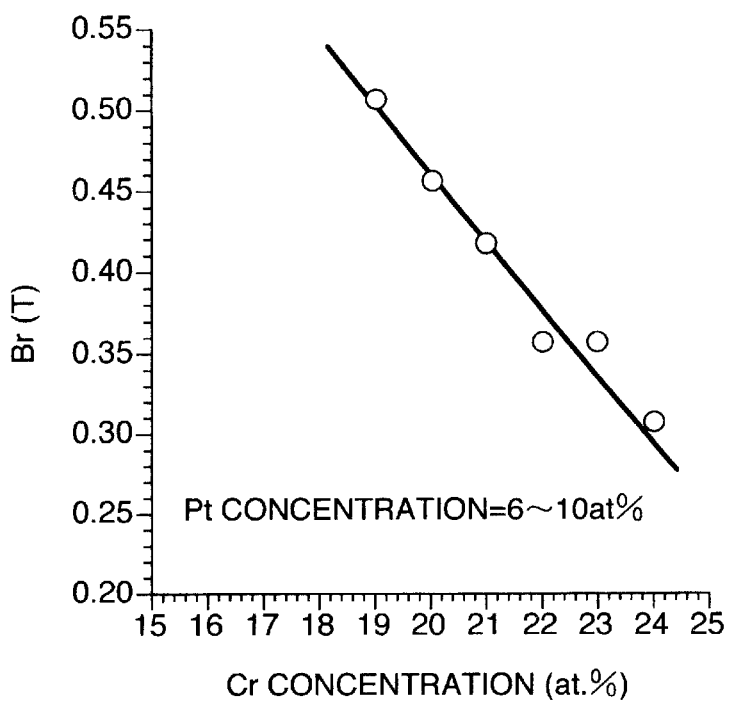
FIG. 3 is a graph showing a relationship between a residual magnetic flux density (Br) and a chromium concentration in a magnetic film of the magnetic recording medium in accordance with the present invention.

The first comparison example is manufactured in the same layer configuration and under the same condition as for first embodiment only excepting that magnetic layers 14 and 14' of the 68 at. % Co-21 at. % Cr-8 at. % Pt-3 at. % Ta alloy are not formed; moreover, since product Br×t is associated with the read output, the thickness of magnetic intermediate layers 13 and 13' of 68 at. % Co-22 at. % Cr-10 at. % Pt alloy is set to 21 nm for the matching of the read output. FIG. 3 shows in a graph a relationship between the Br value and the chromium concentration in magnetic recording medium respectively having different chromium concentration values in the Co—Cr—Pt magnetic layer, the medium having a squareness S (a ratio of the residual magnetic flux density Br to the saturation magnetic flux density Bs) equal to about 0.75.

Comparison Example 2

The second comparison example is manufactured in the same layer configuration and under the same condition as for first embodiment only excepting that magnetic intermediate layers 13 and 13' of 68 at. % Co-22 at. % Cr-10 at. % Pt alloy are not formed; moreover, since product Br×t is associated with the read output, the thickness of magnetic layers 14 and 14' of 68 at. % Co-21 at. % Cr-8 at. % Pt-3 at. % Ta alloy is set to 24 nm to obtain Br×t=7.5 T·nm (75 Gauss·micron). The thickness of magnetic layers 14 and 14' is as shown in FIG. 3. Like chromium, titanium is also a nonmagnetic substance, and hence a total concentration of chromium and titanium of 24 at. % is assumed to be the concentration of chromium to resultantly estimate the value of Br to be 0.31 T (3.1 kilogauss).

Comparison Example 3

The third comparison example is manufactured in the same layer configuration and under the same condition as for first embodiment only excepting that a 25 nm thick underlayer of 70 at. % Cr-30 at. % Mo is manufactured in place of each of magnetic intermediate layers 13 and 13' of 68 at. % Co-22 at. % Cr-10 at. % Pt alloy, magnetic intermediate layers 13 and 13' are not fabricated, and the thickness of magnetic layers 14 and 14' of the 68 at. % Co-21 at. % Cr-8 at. % Pt-3 at. % Ta alloy is set to 24 nm.

TABLE 1

| | Thickness of 68 at % Co-21 at % Cr-8 at % Pt-3 at % Ta magnetic layer (nm) | Thickness of 68 at % Co-22 at % Cr-10 at % Pt intermediate magnetic layer (nm) | Br × t (T · nm) | Hc (kA/m) | S* | S1f/N (dB) | Resolution (%) |
|---|---|---|---|---|---|---|---|
| Embodiment 1a | 17 | 7 | 7.6 | 209 | 0.74 | 27.5 | 49.5 |
| Embodiment 1b | 11.5 | 11.5 | 7.5 | 224 | 0.77 | 27.4 | 50.2 |
| Embodiment 1c | 7 | 15 | 7.3 | 244 | 0.75 | 27.2 | 51.5 |
| Comparative Example 1 | None | 21 | 7.5 | 265 | 0.79 | 26.1 | 53.2 |
| Comparative Example 2 | 24 | None | 3.1 | 103 | 0.20 | — | — |

TABLE 2

| | Thickness of 68 at % Co-21 at % Cr-8 at % Pt-3 at % Ta magnetic layer (nm) | Thickness of 70 at % Cr-30 at % Mo second underlayer (nm) | Br × t (T · nm) | Hc (kA/m) | S* | S1f/N (dB) | Resolution (%) |
|---|---|---|---|---|---|---|---|
| Comparative Example 3 | 24 | 25 | 4.4 | 192 | 0.61 | 23.4 | 47.6 |

Table 1 shows magnetic properties and read/write characteristics of the medium of the first embodiment and the first comparison example and Table 2 shows those of the second and third comparison examples. The magnetic properties, i.e., coercivity (Hc), coercivity squareness (S*), and product Br×t between total thickness of the magnetic layers and intermediate magnetic layers t and residual magnetic flux density Br are measured by applying a maximum magnetic field intensity of 400 kA/m (5 kilooersted) at a room temperature by a vibrating sample magnetometer. The read/write characteristics are measured using a magnetic head including a read-back element of a spin-valve type having a shield gap length Gs of 0.18 micrometer and an inductive write element having a gap length of 0.3 micrometer. S lf indicates a soliton read output, N is a medium noise at a linear recording density of 14200 fr/mm (360 kFCI), and a ratio therebetween S lf/N is used to evaluate the medium. "Resolution" indicating the recording resolution is a ratio of the read output at 14200 fr/mm (360 kFCI) to the read output at 7090 fr/mm (180 kFCI). The medium has a higher recording density as the S lf/N and Resolution becomes greater. As can be seen from Table 1, the coercivity (Hc) of medium a, b, and c of the first embodiment can be adjusted by ratios of thickness of the Co—Cr—Pt—Ta magnetic layer and the Co—Cr—Pt intermediate magnetic layer. There exists a tendency that S lf/N increases and Resolution decreases when the ratio of Co—Cr—Pt—Ta magnetic layer becomes larger than that of Co—Cr—Pt intermediate magnetic layer. Medium a to c of the first embodiment shows higher values of S lf/N and Resolution when compared with the second and third comparison examples. The medium of the first comparison example has the highest value of Resolution, but a lower value of S lf/N. Therefore, each medium of the first embodiment is higher in the error rate about 0.5 dB than the first comparison example.

Figure 4:
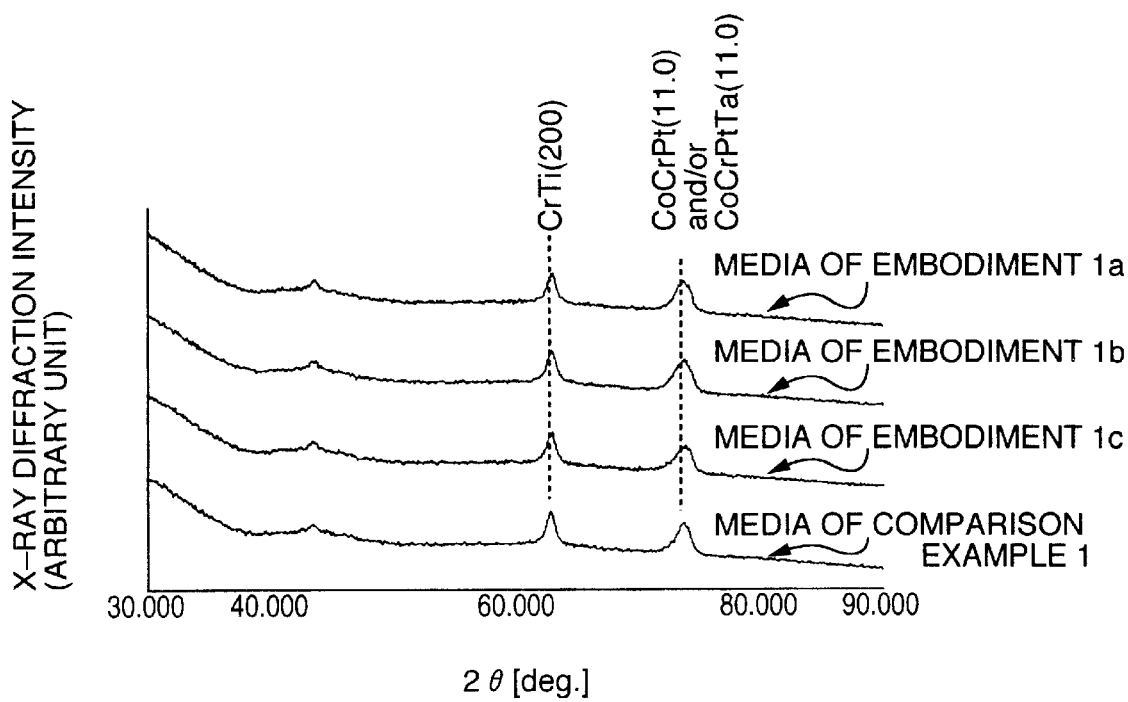
FIG. 4 is a graph showing X-ray diffraction patterns of an embodiment and a comparison example of a magnetic recording medium in accordance with the present invention.
Figure 5:
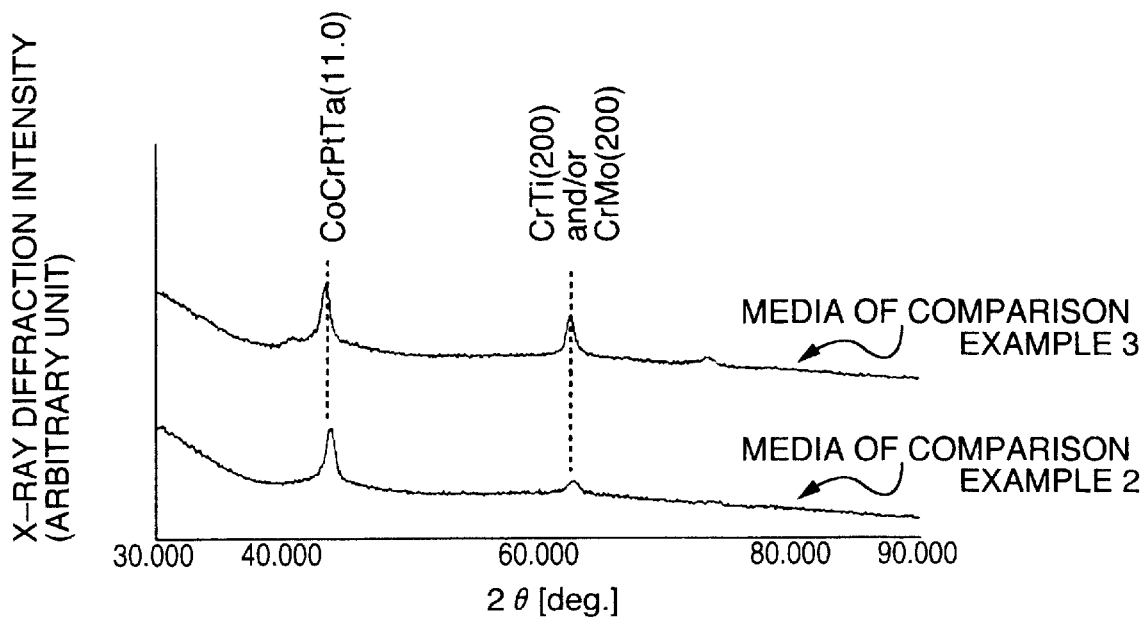
FIG. 5 is a graph showing X-ray diffraction patterns of a medium of the comparison example of a magnetic recording medium in accordance with the present invention.
Figure 6:
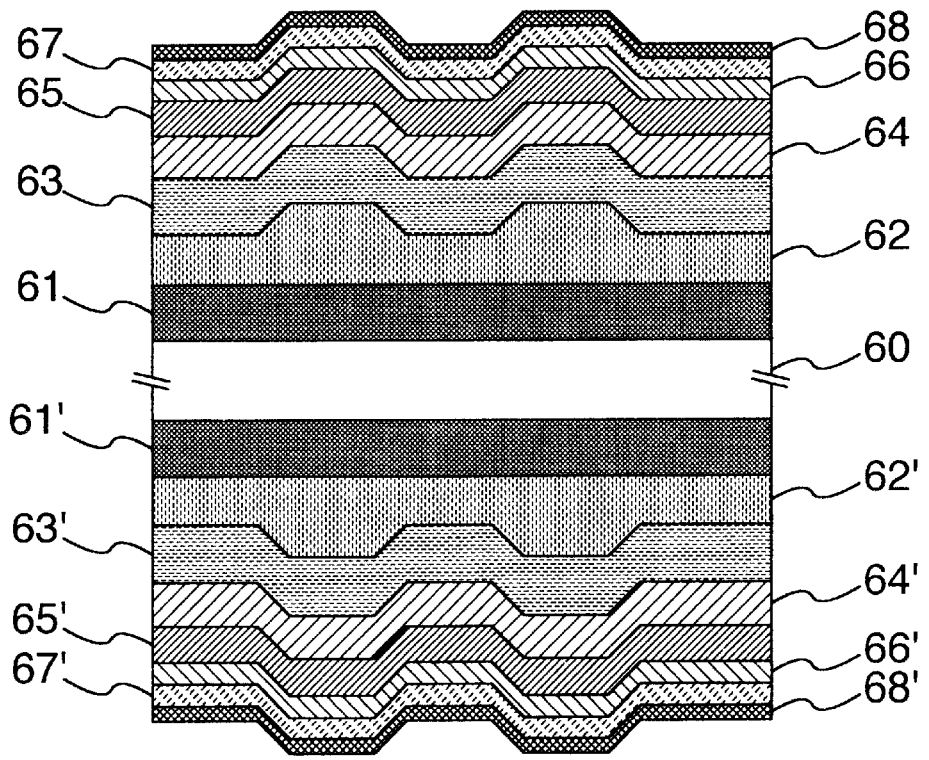
FIG. 6 is a schematic diagram showing an example of a cross-sectional configuration of a magnetic recording medium in accordance with the present invention.

FIG. 4 shows X-ray diffraction patterns respectively of the medium of the first embodiment and the first comparison example. For each medium, this graph clearly shows orientation primarily of a (200) plane of the b.c.c. structure of CrTi and orientation of a (11.0) plane of the h.c.p. structure of Co—Cr—Pt—Ta and/or Co—Cr—Pt. In the medium of the second comparison example, as shown in the X-ray diffraction patterns in FIG. 5, the peak of the (11.0) plane of the b.c.c. structure of Co—Cr—Pt—Ta is rarely found. However, since a (00.2) peak is strong, the vertical anisotropy of the magnetic film is increased. Namely, the magnetic film is vertically magnetized. Therefore, the values of S* and read/write characteristics cannot be easily measured in this situation and hence are not shown. In the medium of the third comparison example, although the (11.0) peak of the h.c.p. structure slightly appears, the (00.2) peak of the h.c.p. structure of the Co—Cr—Pt—Ta magnetic layer is strong. Therefore, the values of Br×t, S*, and Hc are small and hence only insufficient read/write characteristics are attained.

Embodiment 2

As embodiment 2, a magnetic recording medium is produced in the layer configuration of the first embodiment. The medium includes a substrate 10 of a chemically tempered alumino-silicate of 2.5 inch type. Substrate 10 is first washed and a plurality of layers are fabricated thereon with a tact of eight seconds by a sputtering apparatus (MDP250B) of Intevac. On substrate 10, there are fabricated 25 nm thick seed films 11 and 11' with a 60 at. % Co-30 at. % Cr-10 at. % Zr alloy, 25 nm thick underlayers 12 and 12' with an 78 at. % Cr-22 at. % Ti alloy, 9 nm thick magnetic intermediate layers 13 and 13' with a 67 at. % Co-21 at. % Cr-12 at. % Pt alloy, 9 nm thick magnetic layers 14 and 14' with a 70 at. % Co-19 at. % Cr-8 at. % Pt-3 at. % Ta alloy, and 8 nm thick protective carbon layers 15 and 15'. In each film fabrication, an argon gas is at 0.87 Pa (6.5 mTorr). An oxygen partial pressure monitored by main chamber 29 during the film fabrication is from about 1×10⁻⁷ Pa to about 7×10⁻⁷ Pa (from about 8×10⁻¹⁰ Torr to about 5×10⁻⁹ Torr). The seed layers are manufactured in seed film chamber 22 without heating the substrate and are then heated up to 270° by a lamp heater in heating chamber 23. The seed layers are thereafter exposed to an atmosphere of a mixed gas of 95 vol % Ar-4 vol % $N_2$-1 vol % $O_2$ at 0.9 Pa (7 mTorr) at a gas flow rate of 21 sccm for 3.5 seconds in oxidization chamber 24. Thereafter, the respective films are fabricated thereon in underlayer chamber 25, magnetic intermediate film chamber 26, magnetic film chamber 27, and protective film chambers 28 and 28'. After the protective carbon layers are manufactured, a lubricant containing perfluoroalkyl-polyether as its primary element is applied thereon to form 1.8 nm thick lubricant films 16 and 16'.

TABLE 3

|  | Thickness of 70 at % Co- 19 at % Cr- 8 at % Pt- 3 at % Ta magnetic layer (nm) | Thickness of 67 at % Co- 21 at % Cr- 12 at % Pt intermediate magnetic layer (nm) | Br × t (T · nm) | Hc (kA/m) | S* | S1f/N (dB) | Resolution (%) |
|---|---|---|---|---|---|---|---|
| Embodiment 2 | 9 | 9 | 7.2 | 255 | 0.78 | 27.8 | 54.1 |

As a result, the magnetic films and the intermediate magnetic films become smaller in thickness than those of the first embodiment, and the value of Hc is increased. As shown in FIG. 3, the read/write characteristics of the second embodiment are equal to or more than those of the first embodiment.

The medium of the embodiments and the medium of comparison examples above are associated with a magnetic recording disk apparatus of load/unload type and each medium has a flat recording surface. On the other hand, in a magnetic recording disk apparatus of CSS type, to minimize a force of adhesion between a slider on which a magnetic head is mounted and a recording surface of the magnetic recording medium, depressions and projections are required in the surface of the medium. Also in the load/unload type disk apparatus, fine depressions and projections are required on the surface of the magnetic recording medium to mitigate impulsive force at a possible occasion of contact between the slider and the medium surface due to an external disturbance such as dust. A magnetic recording medium to satisfy these requirements is fabricated as a third embodiment.

Embodiment 3

Figure 7:
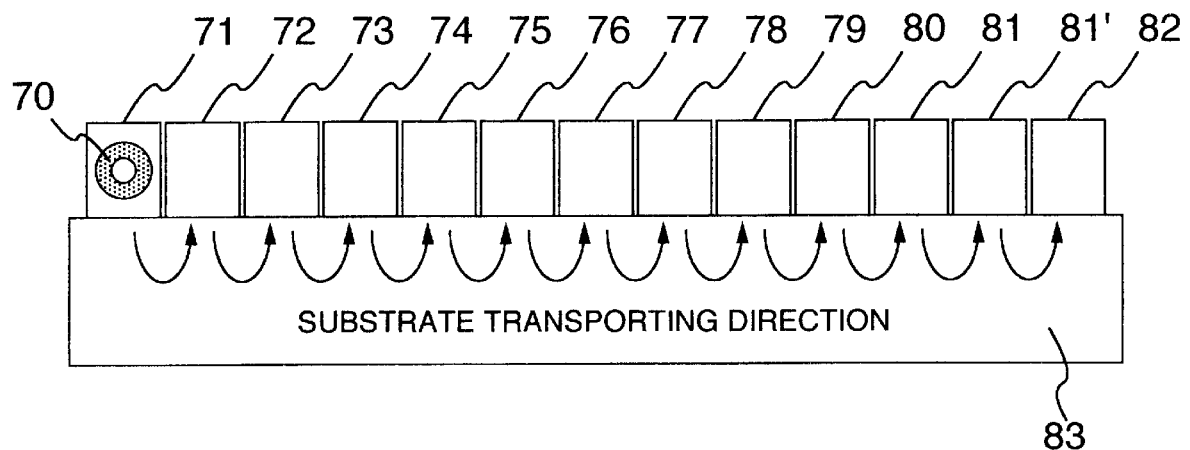
FIG. 7 is a diagram schematically showing a film fabricating apparatus for the magnetic recording medium in accordance with the present invention.

FIG. 1 shows a cross-sectional view of embodiment 3 of a magnetic recording medium in accordance with the present invention. The medium includes a substrate 60 which is a soda-lime glass of 2.5 inch type with a thickness of 0.635 mm, the glass having a surface chemically tempered. Substrate 60 is first washed and then a plurality of layers are fabricated thereon with a tact of nine seconds by a sputtering apparatus (MDP250B) of Intevac. The sputtering apparatus includes chambers or stations as shown in FIG. 7. On substrate 60, there are fabricated 27 nm thick pre-coat layers 61 and 61' of a 60 at. % Co-30 at. % Cr-10 at. % Zr alloy in a pre-coat chamber 71. The substrate is then heated up to about 160° by a lamp heater in a first heating chamber 72 to fabricate thereof uneven layers 62 and 62' including discrete depressions and projections with a 90 at. % Al-10 at. % Cr alloy in a seed chamber 73 and then 20 nm thick seed layers 63 and 63' with a 70 at. % Ni-20 at. % Cr-10 at. % Zr alloy in seed chamber 73. The substrate is then heated up to about 270° by a lamp heater in a second heating chamber 74 to be exposed to an atmosphere of a mixed gas of 99 vol % Ar-1 vol % $O_2$ at a pressure of 0.9 Pa (7 mTorr) and at a gas flow rate of 21 sccm for 3.5 seconds in an oxidization chamber 77. Thereafter, 30 nm thick underlayers 64 and 64' are fabricated thereon with an 80 at. % Cr-20 at. % Ti alloy in an underlayer chamber 78. Fabricated thereon are 11 nm thick magnetic intermediate layers 65 and 65' with a 68 at. % Co-22 at. % Cr-10 at. % Pt alloy, 11 nm thick magnetic layers 66 and 66' with a 68 at. % Co-21 at. % Cr-8 at. % Pt-3 at. % Ta alloy in a magnetic layer chamber 80, and a ten nm thick protective layer 67 and a ten nm thick protective layer 67' in protective layer chambers 81 and 81' (specifically, a 5 nm thick layer is fabricated in each of chambers 81 ad 81'). Thereafter, the substrate is removed from the sputtering apparatus in a removal chamber 82, and then a lubricant containing perfluoroalkyl-polyether as its primary element is applied thereon to form 1.8 nm thick lubricant films 68 and 68'. In the film fabrication of pre-coat layers 61 and 61', seed layers 63 and 63', underlayers 64 and 64', intermediate layers 65 and 65', and magnetic layers 66 and 66', an argon gas is used as a discharge gas at 0.9 Pa (7 mTorr). In the fabrication of protective layers 67 and 67', an argon gas is used as a discharge gas at 1.3 Pa (10 mTorr). To fabricate uneven films 62 and 62', a mixed gas of 99 vol % Ar-1 vol % $O_2$ is used at a pressure of 0.9 Pa (7 mTorr). The contour of the surface of the medium thus produced is examined by an atomic force microscope. It has been confirmed that about 8 nm high projections are fabricated with a density of about 500 per 10 square micrometer. The projection has a diameter of about 100 nm on average. In the evaluation of the medium, the surface is scanned at a speed of about ten micrometers per second to obtain data at 512 points and the scanning line is shifted with a pitch of 20 nm in a direction vertical to the scanning direction to thereby evaluate the surface contour of an area of 10 micrometer×10 micrometer. According to data measured, the surface contour has an average roughness factor Ra of from 1 nm to 2 nm. The height of projection is defined as that in a range of the bearing curve load ratio from 1 % to 99%. Magnetic properties of the medium are measured by the vibrating sample magnetometer. Resultantly, coercivity is 221 kA/m (2.78 kilooersted), coercivity squareness is 0.78, Br×t between magnetic film thickness t and residual magnetic flux density Br is 7.2 T·nm (72 Gauss·micron), which are equivalent to those of the first embodiment.

Figure 8:
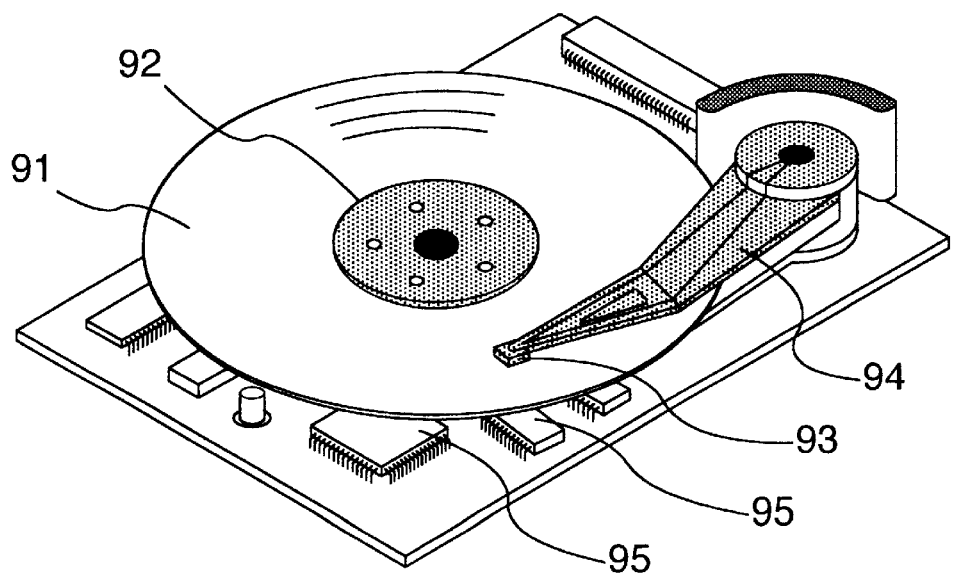
FIG. 8 is a schematic diagram showing an example of a magnetic recording disk apparatus in accordance with the present invention.

FIG. 8 shows a magnetic recording disk apparatus including a magnetic recording medium 91 of the second embodiment, a driving section 92 to drive the medium, a magnetic head 93 including a recording section and read-out section, means 94 to move the head 93 relative to the medium 91, and read/write signal processing means 95 for inputting a signal to the head 93 and for reproducing a signal from the head 93. The read-back section of the magnetic head includes a plurality of conductive magnetic layers of which resistance considerably changes when a direction of magnetization of each conductive magnetic layer is relatively changed due to an external magnetic field and further a magnetoresistive sensor disposed between the conductive magnetic layers, the sensor including a conductive nonmagnetic layer. Namely, the head is configured in a so-called giant magnetoresistive (GMR) head. Read/write characteristics of the medium are evaluated under the conditions of a 40 nm magnetic spacing between the head 93 and the magnetic surface, a linear recording density of 310 kilobits per inch (kBPI), and a track density of 19.5 kilo-tracks per inch (KTPI). As a result, the medium of the first to third embodiments sufficiently satisfies the specifications of read/write characteristics for a magnetic reading disk apparatus with a surface recording density of six gigabits per square inch. In accordance with the present invention, the substrate and the glass substrate are not particularly restricted. Namely, the advantages above can be attained by any known substrates for magnetic recording medium such as an aluminum alloy substrate plated by a Ni—P alloy, glass ceramics, and a silicon substrate.

Next, description will be given of an embodiment in which the intermediate layers of FIGS. 1 and 2 are fabricated with a nonmagnetic substance.

Embodiment 4

A magnetic recording medium is fabricated as embodiment 4 in the same layer configuration and under the same condition as for first embodiment only excepting that each of intermediate layers 13 and 13' is replaced with a 7 nm thick 58 at. % Co-30 at. % Cr-12 at. % Pt alloy layer and each of magnetic layers 14 and 14' is replaced with a 19 nm thick (64 at. % Co-21 at. % Cr-12 at. % Pt-3 at. % Ta alloy layer. Read/write characteristics of the medium are evaluated by the vibrating sample magnetometer. Resultantly, coercivity is 263 kA/m (3.3 kilooersted), coercivity squareness is 0.76, Br×t is 5.9 T·nm (59 Gauss·micron). Namely, high coercivity is obtained with low Br×t. Moreover, a magnetic recording medium is fabricated in the same layer configuration and under the same condition as for a fifth embodiment only excepting that 30 nm thick intermediate layers 13 and 13' are manufactured with 58 at. % Co-30 at. % Cr-12 at. % Pt alloy and magnetic layers 14 and 14' are not fabricated. Read/write characteristics of the medium are evaluated by a vibrating sample magnetometer (BHV-50 of Riken-Denshi). Resultantly, the magnetization measuring range is 0.0025 emu and the value of Br×t is too small for the measurement, and the intermediate layers 13 and 13' of 58 at. % Co-30 at. % Cr-12 at. % Pt becomes substantially nonmagnetic. The medium of the fourth embodiment has read/write characteristics satisfying the specifications of a magnetic recording disk apparatus with a surface recording density of ten gigabits per square inch. Even after the medium is allowed to stand at 70° for 100 hours, the bit error rate is deteriorated at most only by 0.5 order of magnitude. When the surface recording density is ten gigabits per square inch or more, it is effective to fabricate substantially nonmagnetic intermediate Co—Cr—Pt layers as in the fourth embodiment. The intermediate layers favorably have composition including a chromium concentration of from 28 at. % to 40 at. % and a platinum concentration of from 8 at. % to 20 at. %. Thanks to the constitution, the intermediate layers favorably become substantially nonmagnetic and the C-Cr—Pt—Ta layers desirably grow epitaxially.

After having actually installing the recording medium above in a magnetic recording disk apparatus, read/write characteristics of the medium are evaluated using a giant magnetoresistive (GMR) head under the conditions of a 40 nm magnetic spacing between the head and the magnetic film surface, a linear recording density of 310 kBPI (bit per inch), and a track density of 19.5 KTPI (track per inch). As a result, the medium of the first to third embodiments sufficiently satisfies the specifications of read/write characteristics for a magnetic reading disk system with a surface recording density of six gigabits per square inch. In accordance with the present invention, the substrate and the glass substrate are not particularly restricted. Namely, the advantages above can be attained by any known substrates for magnetic recording medium such as an aluminum alloy substrate plated by a Ni—P alloy, glass ceramics, and a silicon substrate.

Embodiment 5

As embodiment 5, a magnetic recording medium is produced in the layer configuration as shown in FIG. 1. The medium includes a substrate 10 of a chemically tempered alumino-silicate of 2.5 inch type. Substrate 10 is first washed and a plurality of layers are fabricated thereon with a tact of 8.5 seconds by a sputtering apparatus (MDP250B) of Intevac. The sputtering apparatus includes chambers or stations as shown in FIG. 2. On substrate 10, there are fabricated 40 nm thick seed films 11 and 11' with a 65 at. % Co-20 at. % Cr-15 at. % Zr alloy, 25 nm thick underlayers 12 and 12' with an 80 at. % Cr-20 at. % Ti alloy, magnetic intermediate layers 13 and 13' with a 66 at. % Co-22 at. % Cr-12 at. % Pt alloy, magnetic layers 14 and 14' with a 63 at. % Co-21 at. % Cr-12 at. % Pt-4 at. % B alloy, and 5 nm thick protective carbon layers 15 and 15'. In each film fabrication, an argon gas has a pressure of 0.9 Pa (7 mTorr). An oxygen partial pressure monitored by main chamber 29 during the film fabrication is from about $1 \times 10^{-7}$ Pa to about $1 \times 10^{-6}$ Pa (from about $1 \times 10^{-9}$ Torr to about $1 \times 10^{-8}$ Torr). The seed layers are manufactured in seed film chamber 22 without heating the substrate and are then heated up to 220° by a lamp heater in heating chamber 23. The seed layers are thereafter exposed to an atmosphere of a mixed gas of 99 vol % Ar-1 vol % $O_2$ at 0.9 Pa (7 mTorr) at a gas flow rate of 20 sccm for 3.5 seconds in oxidization chamber 24. Thereafter, the respective films are fabricated thereon in underlayer chamber 25, magnetic intermediate film chamber 26, magnetic film chamber 27, and protective film chambers 28 and 28'. After the protective carbon layers are manufactured, a lubricant containing perfluoroalkylpolyether as its primary element is applied thereon to form 1.5 nm thick lubricant films 16 and 16'. Samples a to c are produced by setting thicknesses of the intermediate magnetic layers and the magnetic layers to appropriate values such that product Br×t between residual magnetic flux density of the medium Br and magnetic film thickness t is about 5 to 6 T·m (50 to 60 Gauss·micron) as shown in Table 4.

Comparison Example 4

Comparison example 4 is manufactured in the same layer configuration and under the same condition as for the fifth embodiment only excepting that magnetic layers 14 and 14' of 63 at. % Co-21 at. % Cr-12 at. % Pt-4 at. % B alloy are not formed and the thickness of magnetic intermediate layers 13 and 13' of 66 at. % Co-22 at. % Cr-12 at. % Pt is set to 18 nm to obtain product Br×t=5T·nm (50 Gauss·micron) because product Br×t is related to the read output.

Comparison Example 5

Comparison example 5 is manufactured in the same layer configuration and under the same condition as for the fifth embodiment only excepting that magnetic intermediate layers 13 and 13' of 66 at. % Co-22 at. % Cr-12 at. % Pt are not formed and the thickness of magnetic layers 14 and 14' of 63 at. % Co-21 at. % Cr-12 at. % Pt-4 at. % B alloy is set to 21 nm.

Comparison Example 6

Comparison example 6 is manufactured in the same layer configuration and under the same condition as for the fifth embodiment only excepting that 25 nm thick underlayers of an 80 at. % Cr-20 at. % Mo alloy are fabricated in place of intermediate magnetic layers 13 and 13', magnetic intermediate layers 13 and 13' of 66 at. % Co-22 at. % Cr-12 at. % Pt are not formed, and the thickness of magnetic layers 14 and 14' of the 63 at. % Co-21 at. % Cr-12 at. % Pt-4 at. % B is set to 18 nm. Experiments are conducted by changing the molybdenum concentration in a range from 10 at. % to 40 at. % in the Cr—Mo alloy underlayers. As a result, the value of Hc takes a maximum value for 80 at. % Cr-20 at. % Mo, which is hence employed in comparison example 6.

S*, and product Br×t between total thickness t of the magnetic layers and the intermediate magnetic layers and residual magnetic flux density Br are measured by a vibrating sample magnetometer at a room temperature with a maximum magnetic field intensity of 800 kA/m (10 kilooersted). The read/write characteristics are measured by a magnetic head including a read-out element of spin valve type having a shield gap length Gs of 0.15 micrometers and an inductive write element having a gap length of 0.2 micrometer. In the tables, S indicates a read output for 8660 fr/mm (220 kFCI) and N is a medium noise at a linear recording density of 17300 fr/mm (440 kFCI), and S/N (ratio) is used for evaluation. To evaluate a recording resolution, there is employed "Resolution" which is a ratio of the read output at 17300 fr/mm (440 kFCI) to that at 8660 fr/mm (220 kFCI). The recording density of the medium increases as S if/N and Resolution become greater. For medium samples a to c of the fifth embodiment, coercivity Hc can be adjusted by ratios respectively of the Co—Cr—Pt—B magnetic layers and the Co—Cr—Pt intermediate magnetic layers as can be seen from Table 4. Medium a to c has higher values of S if/N and Resolution than the fourth to sixth comparison examples.

Embodiment 6

As embodiment 6, a magnetic recording medium is produced in the layer configuration of the fifth embodiment. The medium includes a substrate 10 of a chemically tempered alumino-silicate of 2.5 inch type. Substrate 10 is first washed and a plurality of layers are fabricated thereon with

TABLE 4

|  | Thickness of 63 at % Co-21 at % Cr-12 at % Pt-4 at % B magnetic layer (nm) | Thickness of 66 at % Co-22 at % Cr-12 at % Pt intermediate magnetic layer (nm) | Br × t (T · nm) | Hc (kA/m) | S* | S/N (dB) | Resolution (%) |
|---|---|---|---|---|---|---|---|
| Embodiment 5a | 9 | 9 | 6.3 | 302 | 0.70 | 20.4 | 58.3 |
| Embodiment 5b | 12 | 6 | 5.8 | 311 | 0.67 | 20.6 | 57.8 |
| Embodiment 5c | 6 | 12 | 5.6 | 298 | 0.68 | 20.5 | 58.3 |
| Comparative Example 4 | None | 18 | 5.7 | 265 | 0.65 | 19.8 | 55.8 |
| Comparative Example 5 | 21 | None | 1.4 | 53 | 0.22 | — | — |

TABLE 5

|  | Thickness of 63 at % Co-21 at % Cr-12 at % Pt-4 at % B magnetic layer (nm) | Thickness of 80 at % Cr-20 at % Mo second underlayer (nm) | Br × t (T · nm) | Hc (kA/m) | S* | S/N (dB) | Resolution (%) |
|---|---|---|---|---|---|---|---|
| Comparative Example 6 | 21 | 15 | 5.2 | 252 | 0.58 | 19.1 | 55.6 |

Table 4 shows magnetic properties and read/write characteristics of the medium of the fifth embodiment and the fourth comparison example and Table 5 shows those of the medium of the fifth and sixth comparison examples. As the magnetic properties, coercivity Hc, coercivity squareness a tact of eight seconds by a sputtering apparatus (MDP250B) of Intevac. On substrate 10, there are fabricated 25 nm thick seed films 11 and 11' with a 60 at. % Co-30 at. % Cr-10 at. % Zr alloy, 25 nm thick underlayers 12 and 12' with an 78 at. % Cr-22 at. % Ti alloy, 8nm thick magnetic intermediate layers 13 and 13' with a 67 at. % Co-21 at. % Cr-12 at. % Pt alloy, 8 nm thick magnetic layers 14 and 14' with a 63 at. % Co-20 at. % Cr-12 at. % Pt-5 at. % B alloy, and 5 nm thick protective carbon layers 15 and 15'. In each film fabrication, an argon gas has a pressure of 0.87 Pa (7.5 mTorr). An oxygen partial pressure monitored by main chamber 29 during the film fabrication is from about $1 \times 10^{-7}$ Pa ($8 \times 10^{-10}$ Torr) to about $7 \times 10^{-7}$ Pa ($5 \times 10^{-9}$ Torr). The seed layers are manufactured in seed film chamber 22 without heating the substrate and are then heated up to 230° by a lamp heater in heating chamber 23. The seed layers are thereafter exposed to an atmosphere of a mixed gas of 95 vol % Ar-4 vol % $N_2$-1 vol % $O_2$ at 0.9 Pa (7 mTorr) at a gas flow rate of 21 sccm for 3.5 seconds in oxidization chamber 24. Thereafter, the respective films are fabricated thereon in underlayer chamber 25, magnetic intermediate film chamber 26, magnetic film chamber 27, and protective film chambers 28 and 28'. After the protective carbon layers are manufactured, a lubricant containing perfluoroalkyl-polyether as its primary element is applied thereon to form 1.5 nm thick lubricant films 16 and 16'.

each of intermediate layers 13 and 13' of FIG. 1 showing the layer configuration is replaced with a 7 nm thick 58 at. % Co-30 at. % Cr-12 at. % Pt alloy layer and each of magnetic layers 14 and 14' is replaced with a 18 nm thick 62 at. % Co-21 at. % Cr-12 at. % Pt-5 at. % B alloy layer. Magnetic properties of the medium of the seventh embodiment are evaluated by the vibrating sample magnetometer. Resultantly, coercivity is 330 kA/m (4.15 kilooersted), coercivity squareness is 0.69, Br×t is 5.4 T·nm (54 Gauss·micron). That is, high coercivity is obtained with low Br×t. Moreover, a magnetic recording medium is fabricated in the same layer configuration and under the same condition as for the seventh embodiment only excepting that 30 nm thick intermediate layers 13 and 13' are manufactured with 58 at. % Co-30 at. % Cr-12 at. % Pt alloy and magnetic layers 14 and 14' are not fabricated. Read/write characteristics of this medium are evaluated by a vibrating sample magnetometer (BHV-50 of Riken-Denshi). Resultantly, the magnetization measuring range is $3.1 \times 10^{-12}$ Wb·m (0.0025 emu) and the value of Br×t is too small for the measurement, and intermediate layers 13 and 13' of 58 at. % Co-30 at. %

TABLE 6

| | Thickness of 63 at % Co-20 at % Cr-12 at % Pt-5 at % B magnetic layer (nm) | Thickness of 67 at % Co-21 at % Cr-12 at % Pt intermediate magnetic layer (nm) | Br × t (T · nm) | Hc (kA/m) | S* | S/N (dB) | Resolution (%) |
|---|---|---|---|---|---|---|---|
| Embodiment 6 | 8 | 8 | 5.6 | 322 | 0.71 | 20.5 | 59.1 |

As a result, the thicknesses of the magnetic films and the intermediate magnetic films can be reduced when compared with those of the fifth embodiment; moreover the value of Hc is increased. Consequently, the read/write characteristics of the sixth embodiment are equal to or more than those of the fifth embodiment as shown in Table 6.

The recording medium above is actually installed in a magnetic recording disk apparatus to evaluate read/write characteristics of the medium using a giant magnetoresistive (GMR) head under the conditions of a 24 nm magnetic spacing between the head and the magnetic film surface, a linear recording density of 510 kBPI, and a track density of 41 kTPI. As a result, the medium of the fifth and that of the sixth embodiments satisfactorily satisfy the specifications of read/write characteristics for a magnetic reading disk apparatus with a surface recording density of 21 gigabits per square inch. Even after the medium is allowed to stand at 70° for 100 hours, the bit error rate is deteriorated only by 0.5 order of magnitude. In accordance with the present invention, the substrate and the glass substrate are not particularly restricted. Namely, the advantages above can be attained by any known substrates for magnetic recording medium such as an aluminum alloy substrate plated by a Ni—P alloy, glass ceramics, and a silicon substrate.

Next, description will be given of an embodiment in which the intermediate layers of FIG. 1 are fabricated with a nonmagnetic substance.

Embodiment 7

A magnetic recording medium is fabricated as embodiment 7 in the same layer configuration and under the same condition as for the fifth embodiment only excepting that Cr-12 at. % Pt become substantially nonmagnetic. The medium of the seventh embodiment has read/write characteristics satisfying the specifications of a magnetic recording disk apparatus with a surface recording density of 30 gigabits per square inch. Even after the medium is allowed to stand at 70° for 100 hours, the bit error rate is deteriorated only by 0.5 order of magnitude or less. When the surface recording density is 30 gigabits per square inch or more, it is effective to fabricate substantially nonmagnetic intermediate Co—Cr—Pt layers as in this embodiment. The intermediate layers favorably have composition including a chromium concentration of from 28 at. % to 40 at. % and a platinum concentration of from 8 at. % to 20 at. %. Thanks to the composition, the intermediate layers desirably become substantially nonmagnetic and the C—Cr—Pt—Ta layers favorably grow epitaxially.

Embodiment 8

A magnetic recording medium is fabricated as embodiment 8 in accordance with the medium of the sixth embodiment by replacing magnetic layers 14 and 14' with 8 nm thick 63 at. % Co-20 at. % Cr-12 at. % Pt-1 at. % Ta-4 at. % B alloy layers. Table 7 shows magnetic properties and read/write characteristics of the medium evaluated in the same way as for the fifth embodiment. As can be seen from Table 7, the value of S/N ratio is increased, as compared with the medium of the sixth embodiment, by using the magnetic films of an alloy to which tantalum and boron are simultaneously added.

TABLE 7

| | Thickness of 63 at % Co-20 at % Cr-12 at % Pt-1 at % Ta-4 at % B magnetic layer (nm) | Thickness of 67 at % Co-21 at % Cr-12 at % Pt intermediate magnetic layer (nm) | Br × t (T · nm) | Hc (kA/m) | S* | S/N (dB) | Resolution (%) |
|---|---|---|---|---|---|---|---|
| Embodiment 8 | 8 | 8 | 5.3 | 308 | 0.70 | 21.1 | 58.1 |

The magnetic recording medium above is actually installed in a magnetic recording disk apparatus to evaluate read/write characteristics of the medium using a giant magnetoresistive (GMR) head under the conditions of a 23 nm magnetic spacing between the head and the magnetic film surface, a linear recording density of 535 kBPI, and a track density of 43 kTPI. As a result, the medium of the eighth embodiment satisfactorily satisfies the specifications of read/write characteristics for a magnetic reading disk apparatus with a surface recording density of 23 gigabits per square inch. Even after the medium is allowed to stand at 70° for 100 hours, the bit error rate is deteriorated only by 0.5 order of magnitude.

polyether as its primary element is applied thereon to form 1.5 nm thick lubricant films 16 and 16'. Samples a and b are produced with the second underlayers respectively of a 75 at. % Cr-25 at. % Mo alloy and a 75 at. % Cr-25 at. % W alloy as shown in Table 8. Table 8 also shows magnetic properties and read/write characteristics of the medium evaluated in the same way as for the fifth embodiment. As can be seen from this table, the magnetic recording medium of the ninth embodiment respectively including the second underlayers respectively of a 75 at. % Cr-25 at. % Mo alloy and a 75 at. % Cr-25 at. % W alloy has higher values of Resolution when compared with the medium of the sixth embodiment.

TABLE 8

| | Composition of second underlayer | Br × t (T · nm) | Hc (kA/m) | S* | S/N (dB) | Resolution (%) |
|---|---|---|---|---|---|---|
| Embodiment 9a | 75 at % Cr-25 at % Mo | 5.1 | 343 | 0.71 | 21.8 | 61.2 |
| Embodiment 9b | 75 at % Cr-25 at % W | 4.9 | 329 | 0.69 | 21.1 | 60.1 |

Embodiment 9

Figure 9:
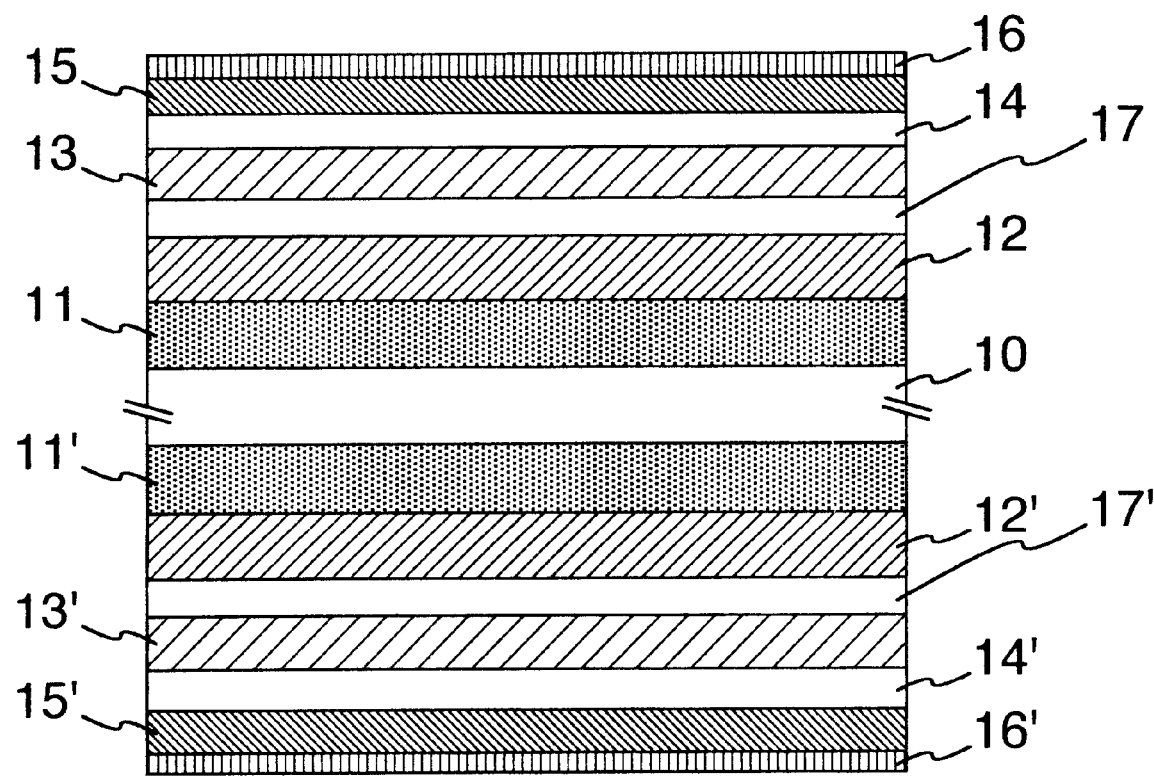
FIG. 9 is a diagram schematically showing an example of a cross-sectional configuration of a magnetic recording medium in accordance with the present invention.

FIG. 9 shows a layer configuration of embodiment 9 of a magnetic recording medium. This medium is produced by additionally fabricating second underlayers 17 and 17' respectively between underlayers 12 and 12' and intermediate layers 13 and 13' of the layer configuration shown in FIG. 1. A sputtering apparatus (MDP250B) of Intevac is employed to manufacture a plurality of layers like in the fifth embodiment. The medium includes a substrate 10 of a chemically tempered alumino-silicate of 2.5 inch type. Substrate 10 is first washed. On substrate 10, there are fabricated 40 nm thick seed films 11 and 11' with a 65 at. % Ni-20 at. % Cr-15 at. % Zr alloy, 15 nm thick underlayers 12 and 12' with a 80 at. % Cr-20 at. % Ti alloy, 7 nm thick second underlayers 17 and 17' with a chromium alloy, magnetic intermediate layers 13 and 13' with a 65 at. % Co-21 at. % Cr-14 at. % Pt alloy, magnetic layers 14 and 14' with a 62 at. % Co-20 at. % Cr-14 at. % Pt-4 at. % B alloy, and 5 nm thick protective carbon layers 15 and 15'. In each film fabrication, an argon gas has a pressure of 0.9 Pa (7 mTorr) as in the fifth embodiment. The seed layers are manufactured without heating the substrate and are then heated up to 220° by a lamp heater. The seed layers are thereafter exposed to an atmosphere of a mixed gas of 99 vol % Ar-1 vol % $N_2$-1 vol % $O_2$ at 0.9 Pa (7 mTorr) at a gas flow rate of 20 sccm for 3.5 seconds. Thereafter, the respective films are fabricated thereon. After the protective carbon layers are manufactured, a lubricant containing perfluoroalkyl- The magnetic recording medium above is actually installed in a magnetic recording disk apparatus to evaluate read/write characteristics of the medium using a giant magnetoresistive (GMR) head under the conditions of a 23 nm magnetic spacing between the head and the magnetic film surface, a linear recording density of 560 kBPI, and a track density of 43 kTPI. As a result, the medium of the ninth embodiment satisfactorily satisfies the specifications of read/write characteristics for a magnetic reading disk apparatus with a surface recording density of 24 gigabits per square inch. Even after the medium is allowed to stand at 70° for 100 hours, the bit error rate is deteriorated only by 0.5 order of magnitude.

The magnetic recording medium of the present invention advantageously reduces the medium noise and is resistive against thermal fluctuation. Thanks to the magnetic recording medium and the magnetoresistive head of the present invention, there can be implemented a magnetic recording apparatus having a recording density of five gigabits per square inch or more.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A magnetic recording medium, comprising:
   an underlayer including a nonmagnetic alloy containing chromium and titanium;

a magnetic layer including a Co—Cr—Pt—Ta alloy; and an intermediate layer of an alloy consisting essentially of Co—Cr—Pt and being disposed between the underlayer and the magnetic layer;

wherein the intermediate layer has a composition of a chromium concentration ranging from 18 at. % to 24 at. %, a platinum concentration ranging from 8 at. % to 20 at. %, and a remaining concentration for cobalt.

2. A magnetic recording medium, comprising:

an underlayer including a nonmagnetic alloy containing chromium and titanium;

a magnetic layer including a Co—Cr—Pt—Ta alloy; and an intermediate layer of an alloy consisting essentially of Co—Cr—Pt and being disposed between the underlayer and the magnetic layer;

further including a second underlayer between the underlayer and the intermediate layer, wherein
the second underlayer includes chromium as a majority element and at least one element of molybdenum and tungsten.

3. A magnetic recording medium in accordance with claim 2, wherein:

the magnetic layer including the Co—Cr—Pt—Ta alloy has a composition of a platinum concentration ranging from 12 at. % to 20 at. %; and the second underlayer has a total concentration of molybdenum and tungsten ranging from 16 at. % to 50 at. %.

4. A magnetic recording medium, comprising:

an underlayer including a nonmagnetic alloy containing chromium and titanium;

a magnetic layer including a Co—Cr—Pt—B alloy; and an intermediate layer including a Co—Cr—Pt alloy and being disposed between the underlayer and the magnetic layer, wherein the intermediate layer has a composition of a chromium concentration ranging from 18 at. % to 24 at. %, a platinum concentration ranging from 8 at. % to 20 at. %, and a remaining concentration for cobalt.

5. A magnetic recording medium, comprising:

an underlayer including a nonmagnetic alloy containing chromium and titanium;

a magnetic layer including a Co—Cr—Pt—B alloy;

an intermediate layer including a Co—Cr—Pt alloy and being disposed between the underlayer and the magnetic layer; and a second underlayer between the underlayer and the intermediate layer, wherein
the second underlayer includes chromium as a majority element and at least one element of molybdenum and tungsten.

* * * * *